(12) United States Patent
Pietsch et al.

(10) Patent No.: US 7,908,832 B2
(45) Date of Patent: Mar. 22, 2011

(54) AGRICULTURAL MACHINE, ESPECIALLY A FIELD CHOPPER

(75) Inventors: Gottfried Pietsch, Hochkirch (DE); Stefan Rauschenbach, Grosspostwitz (DE); Andreas Roth, Neunkirchen-Seelscheid (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 12/503,244

(22) Filed: Jul. 15, 2009

(65) Prior Publication Data
US 2010/0011736 A1    Jan. 21, 2010

(30) Foreign Application Priority Data

Jul. 18, 2008   (DE) .................. 10 2008 033 919

(51) Int. Cl.
*A01D 69/00*    (2006.01)
(52) U.S. Cl. ...................................................... 56/11.9
(58) Field of Classification Search ............... 56/10.8, 56/10.9, 11.1, 11.2, 11.9, 13.5, 14.5, 51, 56/219, 14.1, 14.3; 460/6, 20, 116, 119; 60/445, 484, 448, 447, 449, 431
See application file for complete search history.

(56) References Cited

U.S. PATENT DOCUMENTS

| 4,838,011 | A   | * | 6/1989 | Bramstedt et al. ............. 56/11.7 |
| 5,527,218 | A   | * | 6/1996 | Van den Bossche et al. ... 460/20 |
| 7,219,487 | B2  | * | 5/2007 | Ameye ........................ 56/10.2 H |

FOREIGN PATENT DOCUMENTS

| DE | 196 06 388      | 8/1997 |
| DE | 10 2006 030 971 A1 | 1/2008 |
| EP | 0 300 299       | 1/1989 |
| EP | 0 567 851 A1    | 11/1993 |
| EP | 1 609 351 A1    | 12/2005 |
| EP | 1 875 793 A1    | 1/2008 |

* cited by examiner

*Primary Examiner* — Robert E Pezzuto
(74) *Attorney, Agent, or Firm* — Harness, Dickey & Pierce, P.L.C.

(57) ABSTRACT

An agricultural machine, especially a field chopper, has a carrier vehicle (28) with an intake unit (18) mounted on and arranged to the carrier vehicle (28). The intake unit has an intake gearbox (19) and at least one feed roller (21, 21'; 24, 24') to guide the harvested goods to a chopper drum (10). The intake gearbox (19) is drivingly connected to that at least one feed roller (21, 21'; 24, 24'). The intake unit (18) is at least partially detachably attached to the carrier vehicle (28). A hydraulic motor (17) is mounted on and arranged to the carrier vehicle (28). The hydraulic motor (17) drives the intake gearbox (19). The hydraulic motor (17) has a drive shaft (40) that is detachably and drivingly connected to an input shaft of the intake gearbox (19).

7 Claims, 4 Drawing Sheets

AGRICULTURAL MACHINE, ESPECIALLY A FIELD CHOPPER

CROSS-REFERENCE TO RELATED APPLICATION

This application claims priority to German Patent Application No. 102008033919.9 filed Jul. 18, 2008, which application is herein expressly incorporated by reference.

FIELD

The disclosure relates to an agricultural machine, especially a field chopper, that comprises a carrier vehicle with an attached intake unit with feed rollers.

BACKGROUND

From DE 196 06 388 A1 a self-propelled field chopper is known. It has a carrier vehicle that includes a front, when seen in a driving direction, with a header in the form of a mower with a reel to cut the harvested good and guide it, via a delivery mechanism, to an intake unit. The intake unit is also attached on the carrier vehicle. It includes feed rollers and pre-pressing drums. The rollers and drums are arranged in pairs to each other and are rotatingly driven in opposite directions. The intake unit delivers the flow of harvested good to a chopper drum, also provided on the carrier vehicle, to chop the harvested good. Behind the chopper drum, an acceleration drum is arranged. The acceleration drum delivers the shredded chopper good through an ejection channel to enable passage of the harvested good onto a loading vehicle.

The intake unit is arranged in front of the front wheels of the carrier vehicle. It is driven, via drive shafts, which are drivingly connected to a gearbox. The gearbox is also arranged in front of the front wheels. To be able to carry out maintenance work on the chopper drum, the header as well as the intake unit has to be removable. In order to remove the intake unit, the drive shafts, which drivingly connect the gearbox to the intake unit, are decoupled from the intake unit. Thus, the intake unit together with the feed rollers and the pre-pressing drums are removed from the carrier vehicle. This is generally done by pivoting the intake unit on the carrier vehicle. Thus, the intake unit is not completely removed from the carrier vehicle, but laterally pivoted away, to ensure accessibility to the chopper drum. The gearbox that drives the intake unit remains fast on the carrier vehicle and it is not pivoted, as it is not arranged on the intake unit. This is also necessary, as the gearbox is driven by a hydraulic motor that is directly flange-mounted thereto. The hydraulic lines generally cannot carry out a large angular movement of the hydraulic motor together with the gearbox because of their low flexibility.

DE 10 2006 030 971 A1 also illustrates a self-propelled field chopper. The intake unit is arranged between the front wheels of the carrier vehicle. The gearbox that drives the feed rollers and pre-pressing drums is directly connected to the drums. Thus, because of the missing drive shafts, the gearbox is arranged closer to the drums. Thus, the drums and the gearbox can be arranged, space-wise, between the front wheels. The gearbox is, thus, part of the intake unit and is, for maintenance purposes, at least partially removed together with the feed rollers from the carrier vehicle or pivoted thereto. To enable the pivoting or displacing of the gearbox, the gearbox is connected via a drive shaft arrangement to a hydraulic motor. The hydraulic motor is arranged in the rear area of the carrier vehicle. To remove the intake unit, the drive shaft arrangement can be decoupled from the gearbox.

SUMMARY

It is an object of the present disclosure to provide an agricultural machine with an intake unit that is compact and saves space.

The object is solved by an agricultural machine, especially a field chopper that includes a carrier vehicle. An intake unit is mounted on and arranged with the carrier vehicle. At least one feed roller transports harvested goods to a chopper drum to chop the harvested goods. An intake gearbox is drivingly connected to the at least one feed roller. The intake unit is at least partially detachably attached on the carrier vehicle. A hydraulic motor is mounted on and arranged with the carrier vehicle to drive the intake gearbox. The hydraulic motor has a drive shaft that is detachably and drivingly connected to an input shaft of the intake gearbox.

The hydraulic motor is directly connected to the intake gearbox. It is not connected via a drive shaft arrangement. The hydraulic lines can be arbitrarily run up to the intake gearbox. Thus, the hydraulic motor can be arranged in a space saving manner. Furthermore, the feed rollers are directly driven by the intake gearbox and not via drive shafts. This ensures a space saving arrangement. To ensure in such an arrangement, still, a pivoting of the intake unit, wherein the intake gearbox has to be pivoted, because of the direct drive between the intake gearbox and the feed rollers and, thus, belongs to the intake unit, it is provided, that the hydraulic motor is not arranged to the intake unit, but to the carrier vehicle. This means that the hydraulic motor is not removed with the intake unit or the intake gearbox from the carrier vehicle or is pivoted thereon for maintenance purposes. Rather, the hydraulic motor is fixed to the carrier vehicle. The hydraulic motor can be, for example, pivotably attached on the carrier vehicle. This initially ensures a release of the drive connection between the hydraulic motor and the intake gearbox by displacing the hydraulic motor. The intake unit can be displaced together with the intake gearbox into a maintenance position. In this context, the removal of the intake unit does not inevitably mean that the intake unit has to be completely detached from the carrier vehicle. The intake unit is moved relative to the carrier vehicle to achieve accessibility to the chopper drum. For this, a fast connection of the intake unit on the carrier vehicle is released, so that the intake unit can be moved away from the chopper drum. In this case, the intake unit can be pivoted and/or moved translatory or can be completely removed from the carrier vehicle.

The intake unit can be displaceably, especially pivotably, attached on the carrier vehicle between an operating position and a maintenance position. In the operating position, the hydraulic motor can be connected to the intake gearbox. The hydraulic motor is also displaceable, especially pivotable, between a coupled position, wherein it is drivingly connected with the intake gearbox, and a decoupled position, where it is not drivingly connected to the intake gearbox, on the carrier vehicle.

According to one embodiment, the drive shaft of the hydraulic motor is form-fittingly connected in a releasable manner to the input shaft of the intake gearbox.

In this case, the drive shaft of the hydraulic motor may have longitudinal teeth on an outer circumferential face. The input shaft of the intake gearbox has a central bore with longitudinal teeth. Thus, when the hydraulic motor is drive-wise connected to the intake gearbox, the drive shaft form-fittingly rests in the bore of the input shaft. Correspondingly, the longitudinal teeth on the outer circumferential face of the drive shaft are complimentary formed to the longitudinal teeth of the bore of the input shaft.

To prevent fretting corrosion on the longitudinal teeth, the bore of the input shaft is arranged in a lubricating connection to the intake gearbox. Thus, it is connected to an inner gearbox chamber of the intake gearbox.

Quick action clamping units can be provided for the detachable and secure connection of the hydraulic motor to the intake gearbox. The hydraulic motor is detachably connected to a gearbox housing of the intake gearbox.

Further areas of applicability will become apparent from the following description. The description and specific examples in this summary are intended for purposes of illustration only and are not intended to limit the scope of the present disclosure.

DRAWINGS

A preferred embodiment of the agricultural machine according to the disclosure is described in detail using the drawings.

DETAILED DESCRIPTION

A preferred embodiment of the present disclosure will be described with reference to the accompanying drawings.

Figure 1:
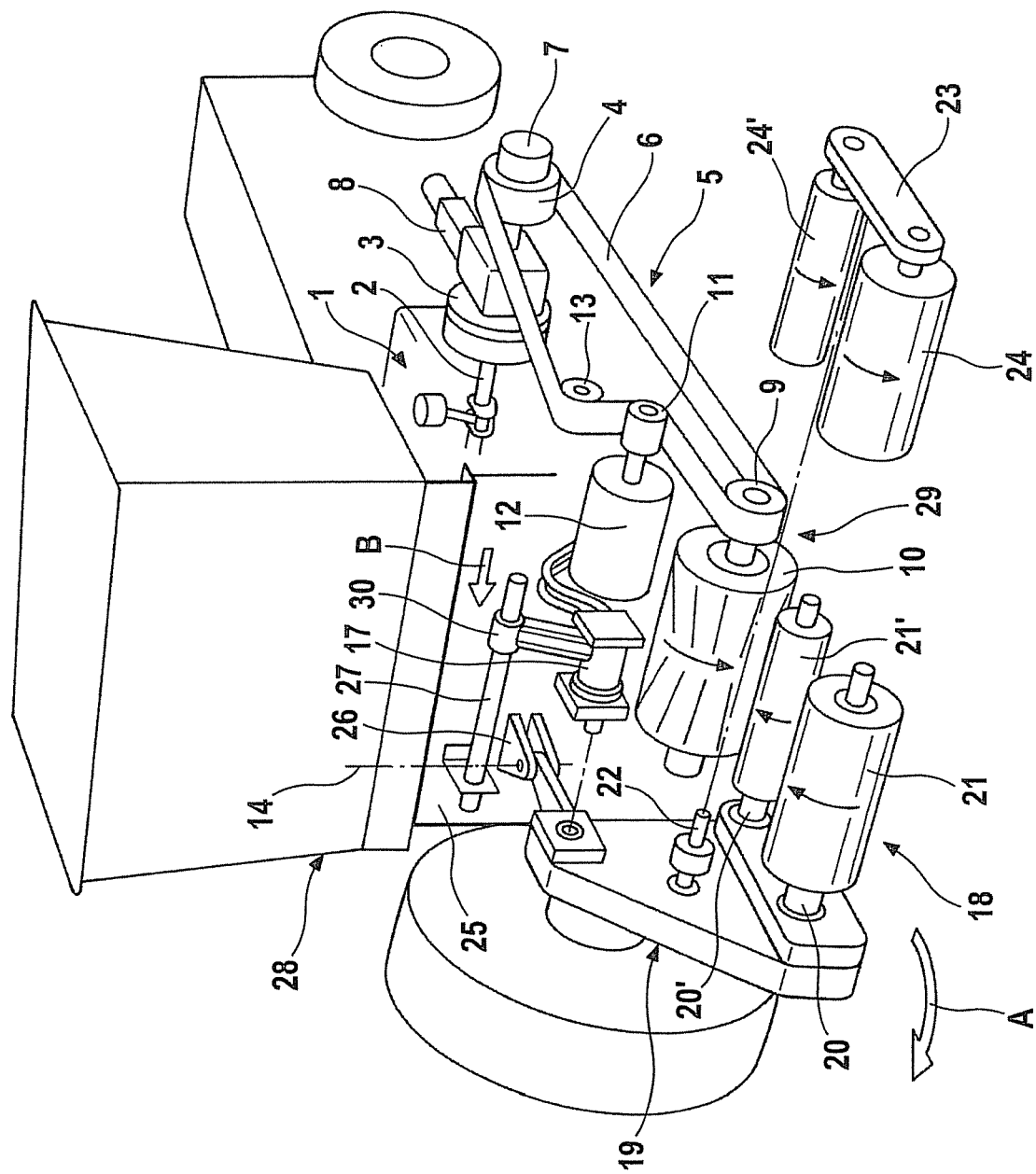
FIG. 1 is a perspective exploded view of a drive arrangement of a field chopper.

FIG. 1 is a perspective exploded view of a drive system of a field chopper. A carrier vehicle 28 of the field chopper has a vehicle frame 25 that is shown schematically. The carrier vehicle 28, when seen in a driving direction, includes a header attached on its front. The header, for example, may be a mower and delivery means, to cut and deliver the harvested goods. The header is, in this case, not shown because of clarity. The harvested goods are delivered, when seen in driving direction, to the rear of the field chopper to an intake unit 18. The intake unit 18 serves to further transport the harvested goods and to pre-press them and to deliver them to the chopping unit 29. The chopping unit 29 is arranged behind where the harvested goods are chopped.

A drive motor 1 in the form of a combustion engine drives the different working aggregates and units. The drive motor 1 is drive-wise connected, via a crankshaft 2, to a motor driven gearbox 3. The motor driven gearbox 3 is formed as a transfer case and drives a belt pulley 4. The belt pulley 4 serves as a drive belt pulley for a belt drive 5 and drives a belt 6. The drive belt pulley 4 can be selectively separated from the drive of the motor driven gearbox 3 or connected thereto by a release clutch 7. Thus, the belt drive 5 can be switched off, while the drive motor 1 is running. The release clutch 7 selectively switches on or off a hydraulic pump 8. A drive shaft for driving the first hydraulic pump 8 is drive-wise connected to the drive belt pulley 4.

The belt drive 5 further includes a first output belt pulley 9 to drive a chopper drum 10 of the chopping unit 29. The chopper drum 10 serves to shred the harvested goods. The flow of harvested goods is delivered by the chopper drum 10 to an acceleration drum 12. From there, the harvested goods are delivered, via a not shown ejection channel. The acceleration drum 12 is driven by a second output belt pulley 11 of the belt drive 5. In the present case, the second output belt pulley 11 is on the loose side of the belt drive 5 between the drive belt pulley 4 and the first output belt pulley 9. Furthermore, on the loose side, when seen in moving direction of the belt 6, a belt tensioning device 13 to tension the belt 6, is arranged in front of the second output belt pulley 11.

The hydraulic pump 8 is connected, via not shown hydraulic lines, to a hydraulic motor 17 to hydraulically drive the intake unit 18. The hydraulic motor 17 is detachably drivingly connected to a first intake gearbox 19 of the intake unit 18. The first intake gearbox 19 has several output shafts 20, 20', that, respectively, are rotatingly drivingly connected to lower feed roller 21, 21'. Furthermore, via a drive shaft 22, which is only shown schematically, the first intake gearbox 19 is drivingly connected to a second intake gearbox 23. The second intake gear box 23 rotatingly drives the upper feed rollers 24, 24'. The intake unit 18 delivers a flow of harvested goods to the chopper drum 10. To deliver the flow, one lower feed roller 21, 21' and one upper feed roller 24, 24' are arranged opposite to each other in pairs and rotate in opposite directions.

The intake unit 18 is attached to the carrier vehicle 28 by hinges 26 to enable maintenance work on and accessibility to the chopper drum. The intake unit 18 pivots around a vertical pivot axis 14 on the carrier vehicle 28 or the vehicle frame 25. Thus, the intake unit 18 can be displaced from the operating position, shown in FIG. 1, into a maintenance position, pivoted in the direction of the arrow A. The intake unit 18 can be pivoted approximately 90° relative to the carrier vehicle 28. Thus, the chopper drum 10 is accessible from the front.

The hydraulic motor 17 is detachably connected to the first intake gearbox 19 to enable the pivoting of the intake unit 18. The hydraulic motor 17 is attached to a support element 30. The support element 30 is displaceable along a bar 27 that is mounted on the carrier vehicle 28. The hydraulic motor 17 can be displaced relative to the carrier vehicle 28 and relative to the intake unit 18 from the decoupled position, shown in FIG. 1, into a coupled position, pivoted in the direction of the arrow B. In the coupled position, the hydraulic motor 17 is drivingly connected to the first intake gearbox 19. In the decoupled position, the drive connection between the hydraulic motor 17 and the first intake gearbox 19 is interrupted or the hydraulic motor 17 is not drivingly connected to the first intake gearbox 19. In this position the intake unit 18 can be laterally pivoted.

To displace the hydraulic motor 17 from its coupled position into its decoupled position, only a small displacement path is necessary. Generally, the hydraulic motor 17 can also be pivotably provided on the carrier vehicle 28. The movement, necessary to displace the hydraulic motor 17 from the coupled position into the decoupled position, is relatively small. Thus, the hydraulic lines that connect the hydraulic motor 17 are only slightly displaced or slightly deformed. A large deformation of the hydraulic lines is generally not possible, since they only have a limited flexibility. Thus, the hydraulic lines are loaded less than they would be in the case if the hydraulic motor 17, when pivoting the intake unit 18, would remain connected on the first intake gearbox 19.

Figure 2:
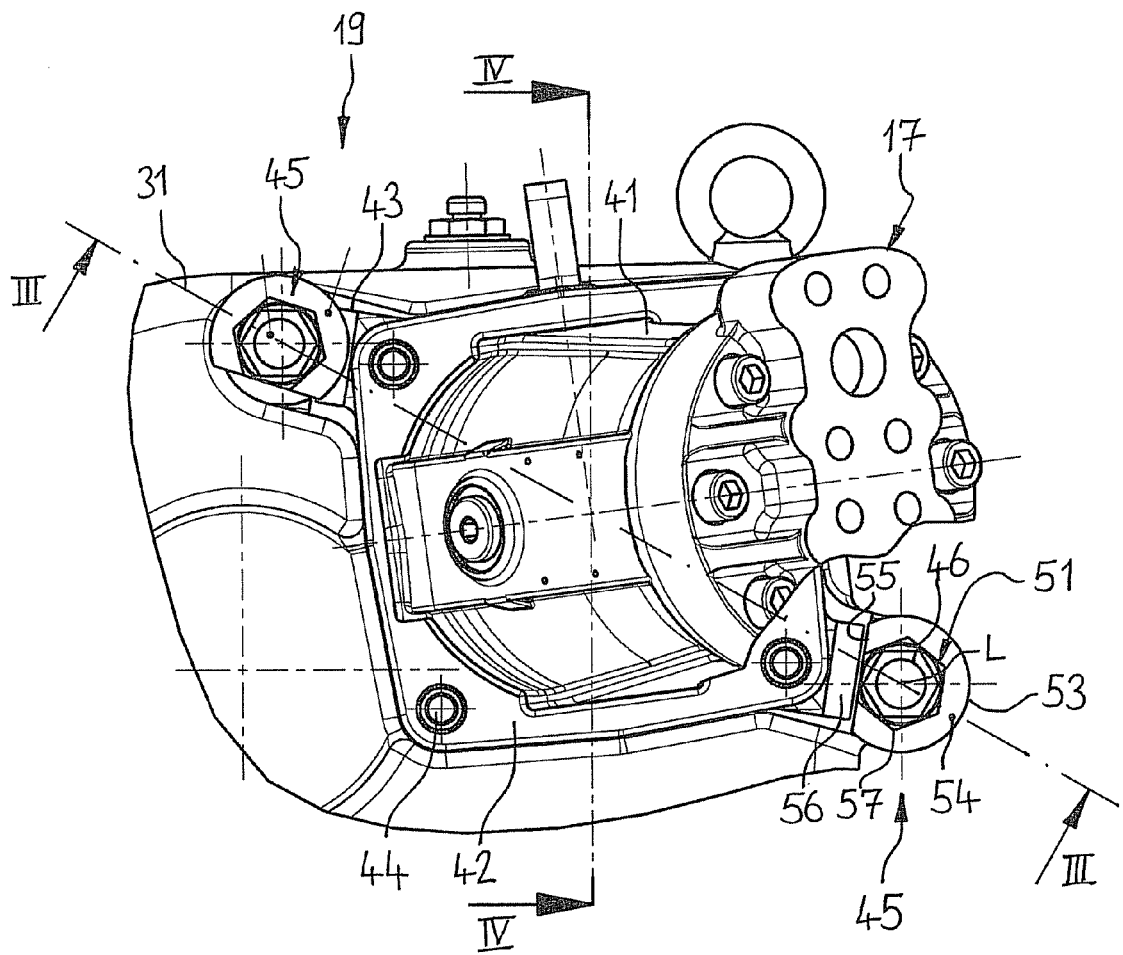
FIG. 2 is a side view of an intake gearbox with a hydraulic motor.
Figure 3:
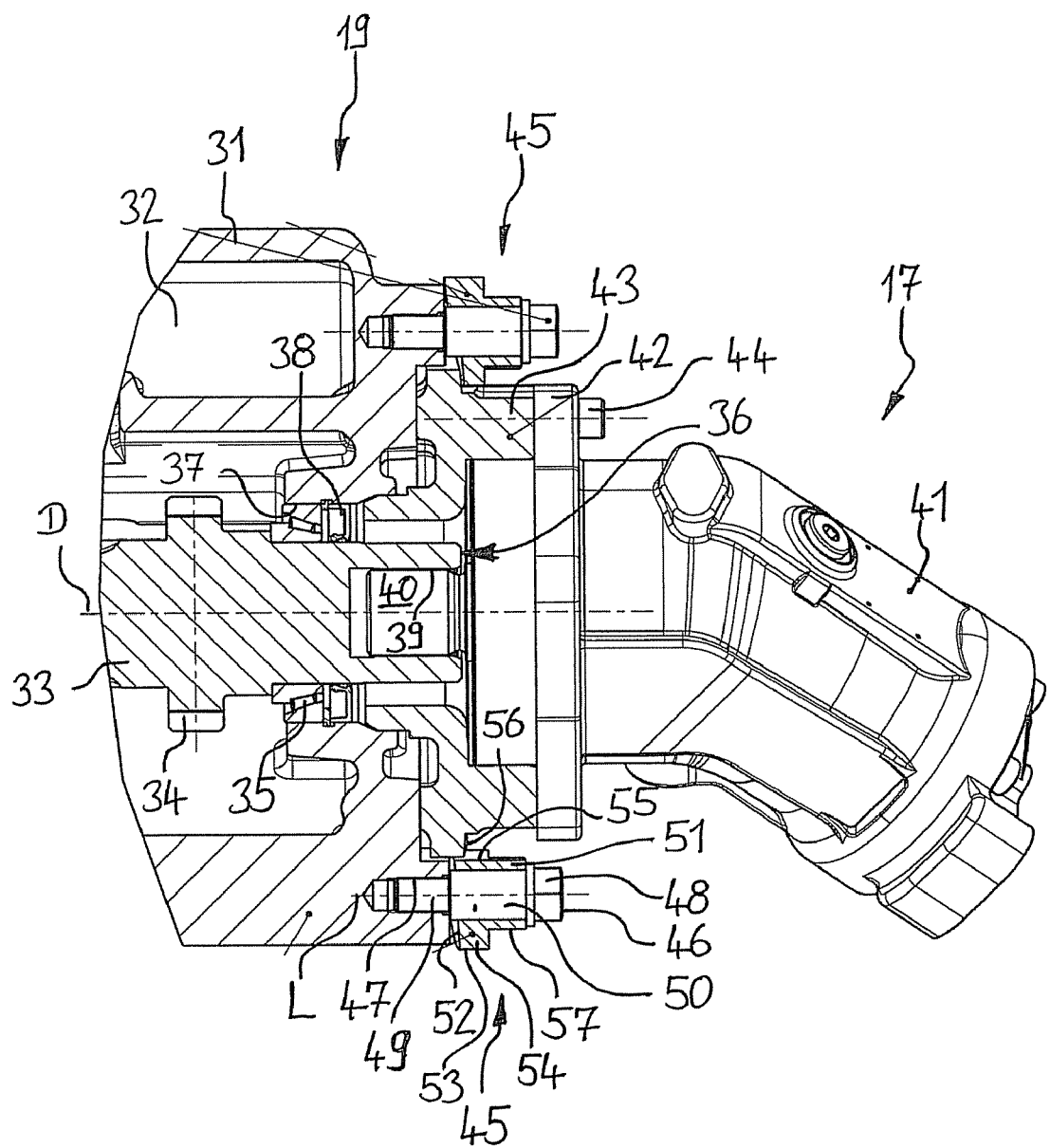
FIG. 3 is a sectional view through the intake gearbox with a first embodiment of a drive connection between a hydraulic motor and an intake gearbox.

FIGS. 2 and 3 show a first embodiment of a connection arrangement between the hydraulic motor 17 and the first intake gearbox 19. They are described together.

The first intake gearbox 19 includes a gearbox housing 31 that forms an inner chamber 32 of the gearbox. The inner chamber 32 of the gearbox is partially filled with oil. An input shaft 33 is rotatably supported around a rotational axis D in the gearbox housing 31. Tapered rolling member bearings 35 are provided in bearing bores 37 of the gearbox housing 31 to provide rotation. The input shaft 33 has a toothed wheel portion 34. The tooth wheel portion 34 is arranged in the inner chamber 32 of the gearbox step and meshes with a further toothed wheel of a gearbox step (not shown here). One shaft end 36 of the input shaft 33 is passed through the bearing bore 37 out of the inner gearbox chamber 32. A radial shaft seal ring 38 is provided to seal the inner gearbox chamber 32 to the outside. The seal ring 38 rests in the bearing bore 37 and is held in a sealing abutment to an outer circumferential face of the input shaft 33.

A central bore 39 is in the shaft end 36 to coaxially receive a drive shaft 40 of the second hydraulic motor along the rotational axis D. The bore 39 has longitudinal teeth (not shown here) that engages longitudinal teeth of the drive shaft 40 (not shown here). Thus, the drive shaft 30 is drivingly connected to the input shaft 33 and can transmit a torque from the drive shaft 40 onto the input shaft 33. The longitudinal teeth enable the drive shaft 40 to be easily decoupled from the input shaft 33. The drive shaft 40 is axially pulled out of the central bore 39 along the rotational axis D.

The hydraulic motor 17 has a housing 41 with a flange 42. The flange 42 is connected by attachment screws 44 to an adaptor 43. The adaptor 43 is quickly detachably connected, via quick action clamping units 45, to the gearbox housing 31 of the first intake gearbox 19. Thus, the hydraulic motor 17 and the adaptor 43 can easily be connected to and separated from the first intake gearbox 19.

Generally, it is also possible to not use quick action clamping units 45 and substitute normal attachment screws to attach the adaptor 43. Another alternative is, to connect the hydraulic motor 17 via the flange 42 directly to the gearbox housing 31 of the first intake gearbox 19. In this case, simple attachment screws or quick action clamping units can be used.

The quick action clamping units 45 have, respectively, a screw 46 that includes a threaded portion 49 that is screwed into a threaded bore 47 of the gearbox housing 31. The screw 46 has a cylindrical bearing portion 50 positioned between a screw head 48 and the threaded portion 49. The screw 46 is supported by the bearing portion 50 in the direction of a longitudinal axis L of the screw 46 axially against the gearbox housing 31. Thus, the bearing portion 50 projects from the gearbox housing 31. A clamping sleeve 51 is arranged on the bearing portion 50 rotatably around the longitudinal axis L. The clamping sleeve 51 has a flange portion 44, that projects radially from the clamping sleeve 51. A hexagon 57 is provided on the clamping sleeve 51 to enable it to be turned by a tool. The flange portion 54 has an outer contour 53 with a recess 55. The recess 55 is formed in the form of a secant relative to the residual circular outer contour 53 of the flange portion 54. The clamping sleeve 51 can be turned around the longitudinal axis L between an insertion position and a clamping position. In FIG. 2, two clamping units 45 are shown.

The clamping sleeve, shown in the view of FIG. 2 on the right, is in the insertion position. The clamping sleeve, shown on the left, is in the clamping position. In the insertion position, a counter clamping face 56 of the adaptor 43 is arranged in the area of the recess 55 of the clamping sleeve 51. The counter clamping face 56 and the adaptor 43 are formed such that the adaptor 43 can abut the gearbox housing 31, in an insertion direction parallel to the longitudinal axes L of the quick action clamping units 45. The clamping sleeve 51 can be turned from its insertion position into the clamping position. The flange portion 54 of the clamping sleeve 51 engages behind the counter clamping face 56. The end-sided clamping face 52 of the flange portion 54 is clamped against the counter clamping face 56. The clamping face 52 extends, in this case, screw-like relative to the longitudinal axis L. Thus, by means of further turning of the clamping sleeve 51, the adaptor 43 is clamped against the gearbox housing 31. In the last range, an angle between the clamping face 52 and a plane, that is arranged vertically to the longitudinal axis L, is dimensioned such that self-locking of the clamping sleeve 51 is produced and an independent detaching of the clamping sleeve 51 is prevented. Also, other quick closing connection units, as they are known from the State of the Art, are conceivable.

Figure 4:
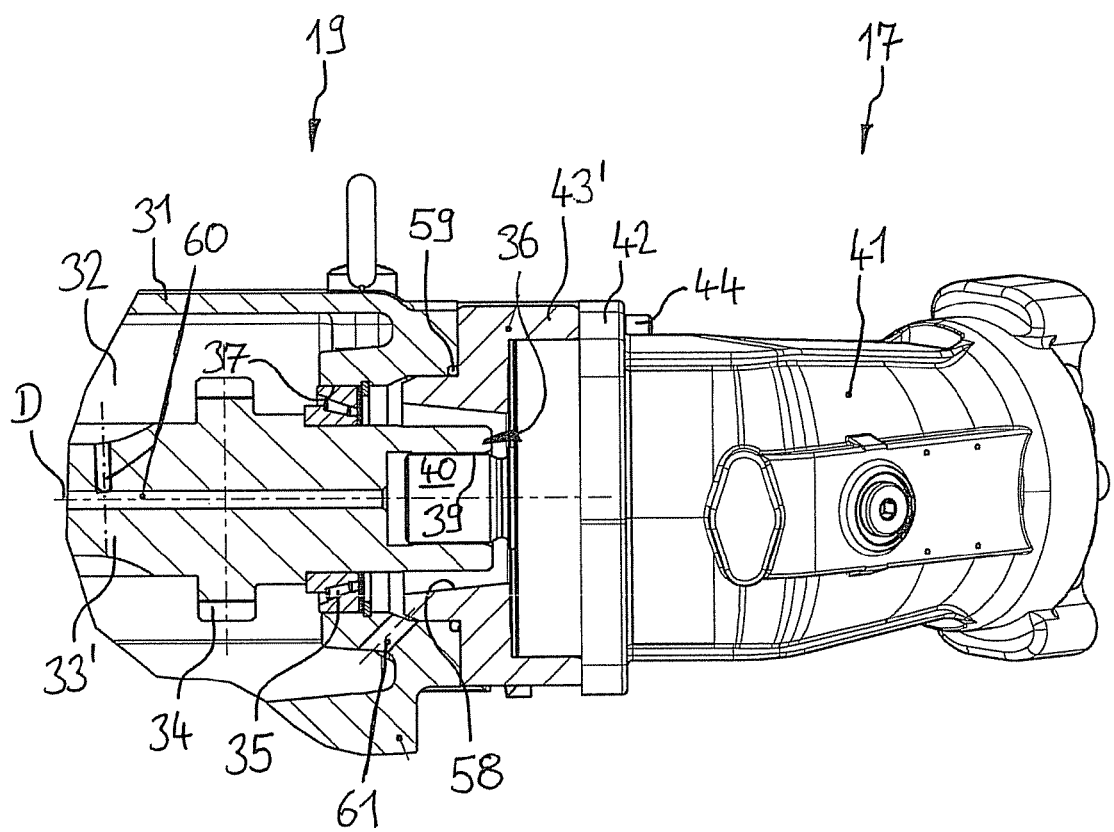
FIG. 4 is a sectional view through the intake gearbox with a second embodiment of a drive connection between a hydraulic motor and an intake gearbox.

FIGS. 4 and 5 show a second embodiment of a connection arrangement between the hydraulic motor 17 and the first intake gearbox 19. The components corresponding to components of the embodiment according to FIGS. 2 and 3, are provided with the same reference numerals.

In the second embodiment, a radial shaft seal ring is not provided in the bearing bore 37 of the gearbox housing 31. Rather a seal 59 is provided between the adaptor 43' and the gearbox housing 31. An oil delivery channel 60 is provided in the input shaft 33'. The channel 60 connects the central bore 39 to the inner gearbox chamber 32. Thus, lubricating oil can be guided from the inner gearbox chamber 32 up to the bore 39. The oil can then generally continue to flow between the longitudinal teeth of the bore 39 and the drive shaft 40.

The adaptor 43' has a central cone-like accommodation bore 58. The bore 58 expands towards the gearbox housing 31 and is coaxially arranged along the rotational axis D. The accommodation bore 58 is arranged such that it accommodates the shaft end 36 of the input shaft 33'. The shaft end 36 enters the accommodation bore 58 and ends within the accommodation bore 58. The input shaft 33' is arranged such that the rotational axis D is horizontally arranged. Thus, the oil that exits from the bore 39 flows into the accommodation bore 58. The oil is guided, because of the conical shape of the accommodation bore 58, in the direction towards the gearbox housing 31. There it flows into the bearing bore 37 of the gearbox housing 31. An oil return channel 61 is provided in a vertical lower area of the bearing bore 37. The oil return channel 61 leads from the bearing bore 37 back to the inner gearbox chamber 32. Thus, the oil can flow back into the inner gearbox chamber 32.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. An agricultural machine, comprising:
a carrier vehicle;
an intake unit coupled with the carrier vehicle, the intake unit includes at least one feed roller for transporting harvested goods to a chopper drum for chopping the harvested goods and an intake gearbox that is drivingly connected to the at least one feed roller, said intake unit is at least partially detachably attached on the carrier vehicle for enabling movement of the intake unit between a first position, where the intake unit is aligned for processing harvest goods, and a second position, where the unit is moved out of alignment for processing harvested goods enabling maintenance to be conducted on the intake unit;
a hydraulic motor coupled with the carrier vehicle, said hydraulic motor driving the intake gearbox, said hydraulic motor has a drive shaft that is detachably and drivingly connected to an input shaft of the intake gearbox.

2. The agricultural machine according to claim 1, wherein the intake unit is displaceably attached, by pivoting, between an operating position and a maintenance position to the carrier vehicle.

3. The agricultural machine according to claim 1, wherein the hydraulic motor on the carrier vehicle is displaceable between a coupled position, wherein it is drivingly connected to the intake gearbox, and a decoupled position, where the drive connection with the intake gearbox is interrupted.

4. The agricultural machine according to claim 1, wherein the drive shaft of the hydraulic motor is form-fittingly connected in a detachable manner to the input shaft of the intake gearbox.

5. The agricultural machine according to claim 4, wherein the drive shaft of the hydraulic motor has longitudinal teeth on an outer circumferential face, said input shaft of the intake gearbox has a central bore with longitudinal teeth and when the intake gearbox is drivingly connected to the hydraulic motor, the drive shaft form-fittingly rests in the bore of the input shaft.

6. The agricultural machine according to claim 5, wherein the bore of the input shaft is arranged in a lubricating connection to the intake gearbox and is connected to an inner gearbox chamber of the intake gearbox.

7. The agricultural machine according to claim 1, wherein the hydraulic motor is detachably connected by quick action clamping units to a gearbox housing of the intake gearbox.

* * * * *